(12) United States Patent
Eom et al.

(10) Patent No.: US 11,009,768 B2
(45) Date of Patent: *May 18, 2021

(54) LIQUID LENS AND CAMERA MODULE INCLUDING THE SAME

(71) Applicant: LG INNOTEK CO., LTD., Seoul (KR)

(72) Inventors: Jun Phill Eom, Seoul (KR); Ui Jun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/499,558

(22) PCT Filed: Mar. 30, 2018

(86) PCT No.: PCT/KR2018/003756
§ 371 (c)(1),
(2) Date: Sep. 30, 2019

(87) PCT Pub. No.: WO2018/182349
PCT Pub. Date: Oct. 4, 2018

(65) Prior Publication Data
US 2020/0041863 A1 Feb. 6, 2020

(30) Foreign Application Priority Data
Mar. 30, 2017 (KR) .................. 10-2017-0040774

(51) Int. Cl.
*H04N 5/225* (2006.01)
*G02F 1/29* (2006.01)
*H04N 5/232* (2006.01)

(52) U.S. Cl.
CPC ........... *G02F 1/29* (2013.01); *H04N 5/23287* (2013.01); *G02F 1/294* (2021.01)

(58) Field of Classification Search
CPC . G02F 1/29; G02F 2001/294; H04N 5/23287; H04N 5/23212; H04N 5/2253; H04N 5/2254; G02B 3/14; G02B 27/64
See application file for complete search history.

(56) References Cited

U.S. PATENT DOCUMENTS

2008/0037973 A1 2/2008 Jung
2008/0100922 A1 5/2008 Choi et al.
(Continued)

FOREIGN PATENT DOCUMENTS

CN 105158827 A 12/2015
JP 2007-121846 A 5/2007
(Continued)

*Primary Examiner* — Twyler L Haskins
*Assistant Examiner* — Angel L Garces-Rivera
(74) *Attorney, Agent, or Firm* — Birch, Stewart, Kolasch & Birch, LLP

(57) ABSTRACT

A liquid lens includes a cavity in which a conductive liquid and a non-conductive liquid are disposed and at least one first through-hole in which at least one of a conductive material or an adhesive material is disposed, a first electrode disposed on the first plate, a second electrode disposed under the first plate, the second electrode including a plurality of electrode sectors, a second plate disposed on the first electrode, and a third plate disposed under the second electrode.

20 Claims, 5 Drawing Sheets

(56) References Cited

U.S. PATENT DOCUMENTS

| | | | |
|---|---|---|---|
| 2008/0267603 | A1 | 10/2008 | Jung et al. |
| 2008/0304160 | A1 | 12/2008 | Hendriks et al. |
| 2009/0190232 | A1 | 7/2009 | Craen et al. |
| 2012/0113525 | A1 | 5/2012 | Kong et al. |
| 2019/0369304 | A1* | 12/2019 | Kim .................. G02B 26/005 |

FOREIGN PATENT DOCUMENTS

| | | |
|---|---|---|
| KR | 10-2006-0129322 A | 12/2006 |
| KR | 10-2008-0014274 A | 2/2008 |
| KR | 10-0843473 B1 | 7/2008 |
| KR | 10-2010-0109729 A | 10/2010 |

\* cited by examiner

[FIG. 1]
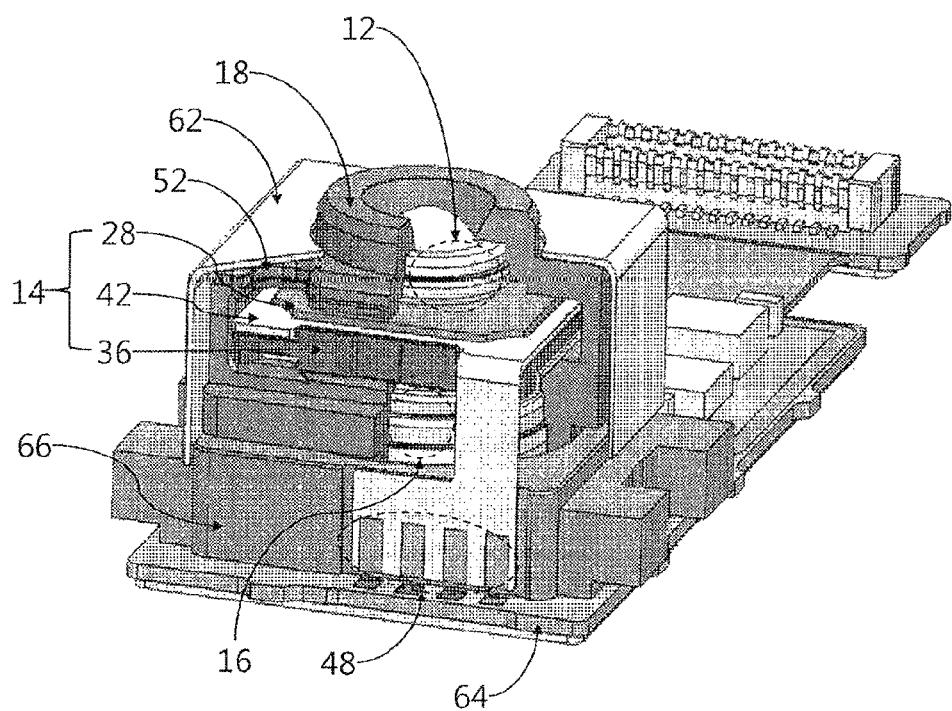

[FIG. 2]
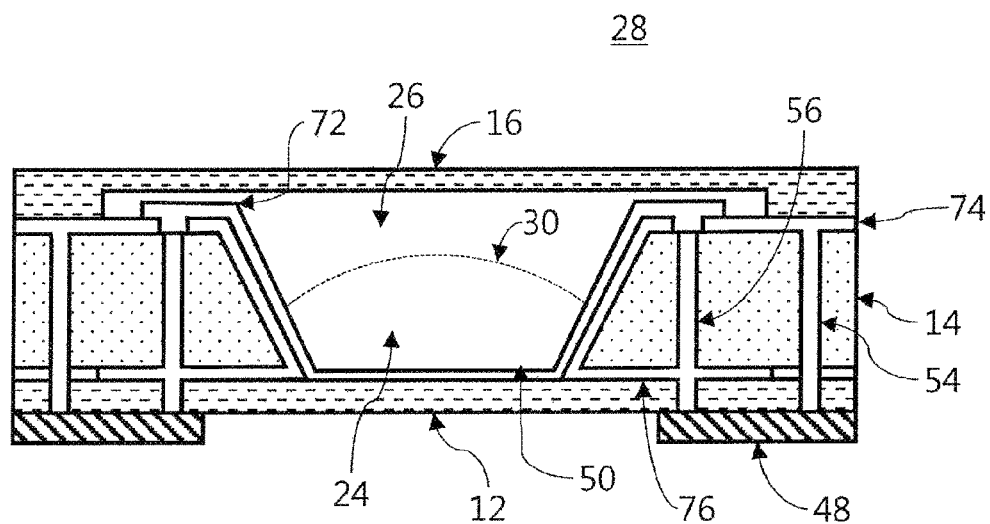
[FIG. 3]
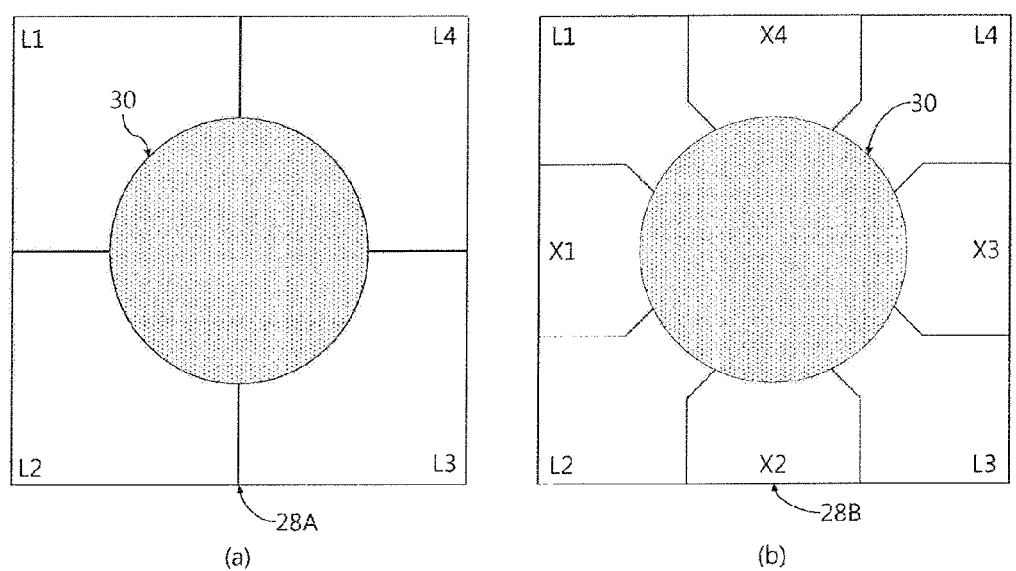
(a)　　　　　　　　　　　(b)

[FIG. 4]
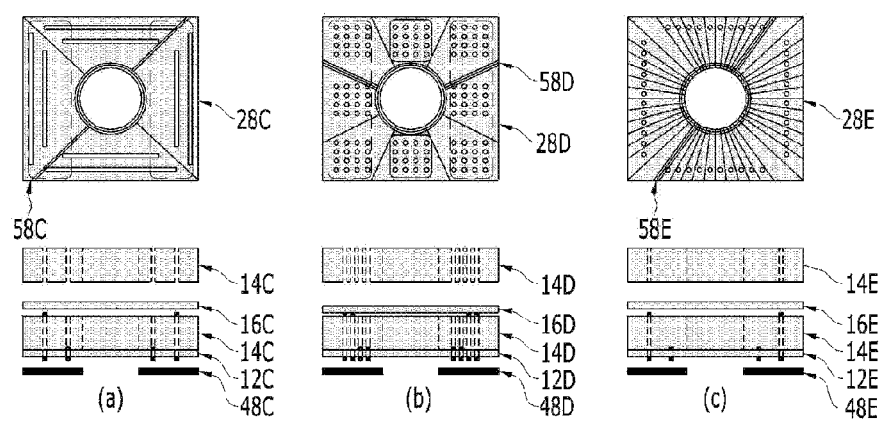
[FIG. 5]
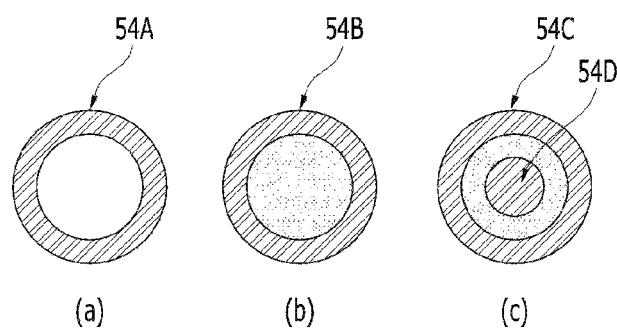

【FIG. 6】
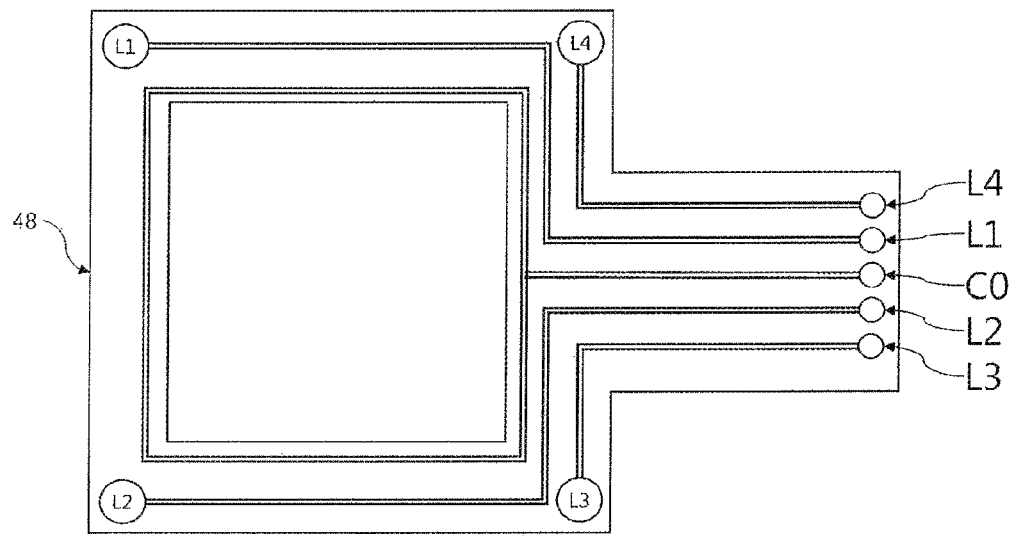
【FIG. 7】
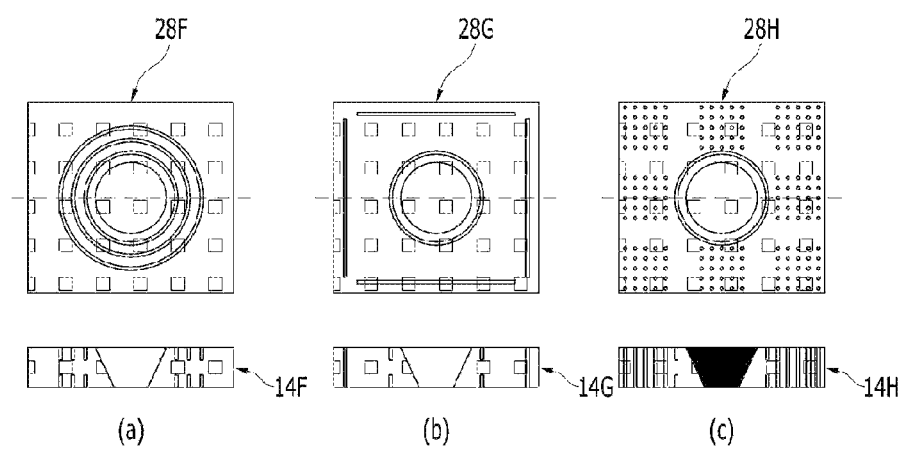
(a)           (b)           (c)

[FIG. 8]
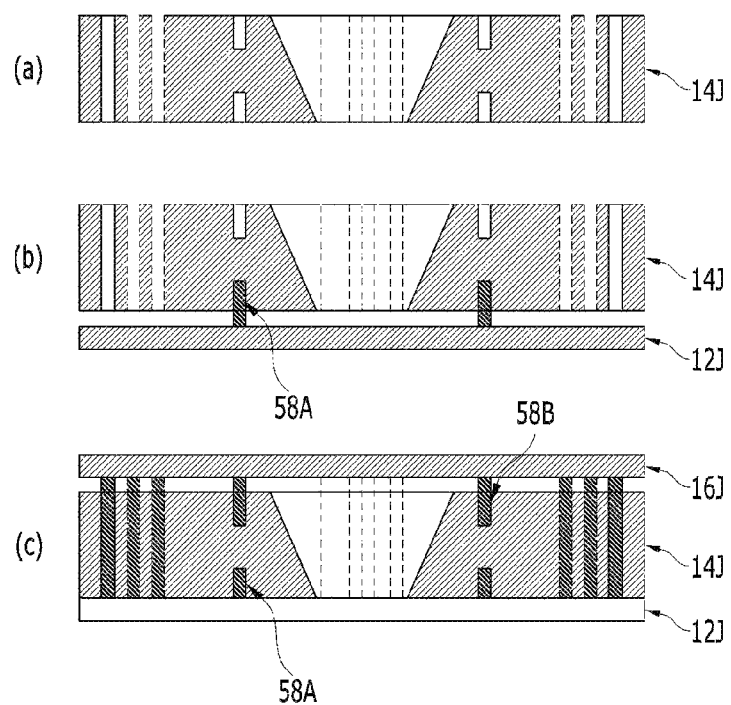

LIQUID LENS AND CAMERA MODULE INCLUDING THE SAME

CROSS REFERENCE TO RELATED APPLICATIONS

This application is the National Phase of PCT International Application No. PCT/KR2018/003756, filed on Mar. 30, 2018, which claims priority under 35 U.S.C. 119(a) to Patent Application No 10-2017-0040774, filed in the Republic of Korea on. Mar. 30, 2017, all of which are hereby expressly incorporated by reference into the present application.

TECHNICAL FIELD

Embodiments relate to a liquid lens, a camera module including the same, and an optical device. More particularly, embodiments relate to a liquid lens enabling adjustment of a focal length using electrical energy and a camera module including the same.

BACKGROUND ART

People who use portable devices demand optical devices that have high resolution, are small, and have various photographing functions. Examples of various photographing functions may include an autofocus (AF) function, a hand-tremor compensation or optical image stabilization (OIS) function, and the like. Such photographing functions may be realized by directly moving a plurality of lenses that are combined. In the case in which the number of lenses is increased, however, the size of an optical device may be increased. The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens-moving apparatus is used to move the lens module. However, the lens-moving apparatus consumes a lot of power, and an additional cover glass needs to be provided separately from the camera module in order to protect the lens-moving apparatus, thus leading to an increase in the overall thickness of an optical device. Therefore, research has been conducted on a liquid lens configured to electrically adjust the curvature of an interface between two kinds of liquid in order to perform autofocus and hand-tremor compensation functions.

DISCLOSURE

Technical Problem

Embodiments may provide a camera module including a lens enabling adjustment of the location of an interface formed between two liquids using electrical energy and an optical device, in which the liquid lens has a structure capable of more precisely controlling the location and movement of the interface.

In addition, embodiments may provide a structure in which at least one trench and at least one through-hole as well as a cavity are disposed in a plate included in a lens, thereby realizing formation of an electrode or increasing bonding strength.

In addition, embodiments may provide a liquid lens and an electrode or an electrode sector structure of the liquid lens, in which a focal point of an interface formed in the lens may be adjusted in a predetermined direction including the north, south, east, and west directions, diagonal directions such as northeast, southeast, northwest, and southwest, or more fragmented directions such as sixteen directions or thirty-two directions.

However, the objects to be accomplished by the disclosure are not limited to the above-mentioned objects, and other objects not mentioned herein will be clearly understood by those skilled in the art from the following description.

Technical Solution

In one embodiment, a liquid lens may include a first plate including a cavity in which a conductive liquid and a non-conductive liquid are disposed and at least one through-hole or at least one trench in which at least one of a conductive material or an adhesive material is charged, a first electrode disposed on the first plate, a second electrode disposed under the first plate, the second electrode including a plurality of electrode sectors, a second plate disposed on the first electrode, and a third plate disposed under the second electrode.

In addition, the adhesive material may be charged into the at least one trench, and one of the adhesive material and the conductive material or both the adhesive material and the conductive material may be charged into the at least one through-hole.

In addition, the through-hole may include at least one first through-hole, which is located in the region corresponding to each of the plurality of electrode sectors and connects at least one of the first electrode or the second electrode.

In addition, the third plate may include a second through-hole corresponding to the first through-hole.

In addition, a conductive material may be applied to an inner side of at least one of the first through-hole or the second through-hole.

In addition, the liquid lens may further include a conductive pattern disposed on an inner side surface of at least one of the first through-hole or the second through-hole.

In addition, an insulating adhesive material may be charged inside the conductive pattern disposed on the inner side surface of the first through-hole or the second through-hole.

In addition, at least one of the first through-hole or the second through-hole may include a first conductive pattern disposed on the inner side surface thereof, a second conductive pattern disposed at the center thereof, and an insulating adhesive material charged between the first conductive pattern and the second conductive pattern.

In addition, the first through-hole may include a first hole pattern, which may be electrically connected to the first electrode, and a second hole pattern, which may be spaced apart from the first hole pattern and may be electrically connected to the second electrode. The second hole pattern may be closer to the cavity than the first hole pattern.

In addition, the first hole pattern or the second hole pattern may expose a bar-shaped space in the plane, and the first hole pattern may be longer than the second hole pattern.

In addition, the first hole pattern or the second hole pattern may include a plurality of holes, which are disposed at predetermined intervals and expose circular or polygonal spaces in the plane.

In addition, the liquid lens may further include an adhesive pattern, which is applied to the periphery of the third plate and between the plurality of electrode sectors and bonds the first plate and the third plate to each other.

In addition, the number of electrode sectors may be a multiple of four.

In addition, the cavity may have a circular planar shape, and the electrode sectors may be disposed at the same angular intervals with respect to the cavity.

In addition, the at least one trench may be disposed to be closer to the cavity than the at least one through-hole.

In another embodiment, a camera module may include the above-described liquid lens, an image sensor converting light transmitted through the liquid lens into an electrical signal, a control circuit generating an electrical signal or a driving voltage, or transmitting the electrical signal or the driving voltage to the first electrode and the second electrode included in the liquid lens in order to control an interface, and a board connected to at least one of the first through-hole or the second through-hole, the board supplying a driving voltage to the first electrode and the second electrode.

In addition, the first board may include a plurality of second wire patterns supplying second individual voltages to the plurality of electrode sectors, a first wire pattern disposed outside the plurality of second wire patterns and supplying a first common voltage to the plurality of electrode sectors, and a plurality of terminals connected to the first wire pattern and the second wire patterns.

In still another embodiment, an optical device may include a housing, a display unit disposed in the housing, the display unit being configured to output an image, and a camera module disposed in the housing, the camera module being configured to capture an image, the camera module including a liquid lens including a first plate including a cavity in which a conductive liquid and a non-conductive liquid are disposed and at least one through-hole or at least one trench in which at least one of a conductive material or an adhesive material is charged, a first electrode disposed on the first plate, a second electrode disposed under the first plate, the second electrode including a plurality of electrode sectors, a second plate disposed on the first electrode, and a third plate disposed under the second electrode, a lens holder accommodating the liquid lens and a solid lens therein, a sensor board disposed under the lens holder, the sensor board including an image sensor disposed thereon, a controller disposed on the sensor board, the controller controlling voltages applied to the common electrode and the individual electrodes, and a board connected to at least one of the first through-hole or the second through-hole, the board supplying a driving voltage to the first electrode and the second electrode.

However, the above aspects of the present disclosure are only a part of the exemplary embodiments of the present disclosure, and various embodiments based on the technical features of the present disclosure may be devised and understood by those skilled in the art from the following detailed description of the present disclosure.

Advantageous Effects

The effects of a device according to the disclosure will be described below.

According to the embodiment, a plurality of plates included in a liquid lens, which includes two different liquids, may be bonded in a hermetic sealing manner, thereby reducing defects of the liquid lens.

In addition, according to the embodiment, electrodes, which are disposed in the liquid lens, may be connected on one side of the liquid lens, thereby simplifying the modular structure including the liquid lens.

In addition, the liquid lens according to the embodiment may enable adjustment of a focal length such that a focal point of an interface in the lens is moved in more fragmented directions such as eight directions or sixteen directions, thereby making it possible to more easily realize optical image stabilization (OIS).

In addition, according to the embodiment, the arrangement of a connection device for supplying a driving voltage to the liquid lens, which includes two liquids forming an interface therebetween, and the arrangement of electrodes disposed in the lens may be modified so as to more precisely control the interface of the lens.

However, the effects achievable through the disclosure are not limited to the above-mentioned effects, and other effects not mentioned herein will be clearly understood by those skilled in the art from the following description.

DESCRIPTION OF DRAWINGS

The accompanying drawings, which are included to provide a further understanding of the disclosure, illustrate embodiments of the disclosure together with the detailed description. The technical features of the disclosure are not limited to specific drawings, and the features shown in the drawings may be combined to construct new embodiments.

FIG. 1 illustrates a camera module.

FIG. 2 illustrates a first example of a liquid lens.

FIG. 3 illustrates an electrode sector of the liquid lens.

FIG. 4 illustrates another example of the liquid lens.

FIG. 5 illustrates the structure of a through-hole included in a first plate or a third plate.

FIG. 6 illustrates the structure of a board that applies a driving voltage to the liquid lens.

FIG. 7 illustrates still another example of the liquid lens.

FIG. 8 illustrates a method of assembling the liquid lens.

BEST MODE

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

FIG. 1 illustrates a camera module.

The camera module illustrated in FIG. 1 may include a holder 18, which includes an open upper portion and an open lower portion, a liquid lens module 14 accommodated in the holder 18, a first lens unit 12 disposed on the liquid lens module 14, a second lens unit 16 disposed below the liquid lens module 14, and a sensor board 64 disposed below the second lens unit 16 and having an image sensor mounted thereon.

The liquid lens module 14 may include a liquid lens including an interface formed between two liquids, a spacer 36 surrounding the liquid lens 28, and at least one board 42 for supplying a driving voltage to the liquid lens 28. The board 42 may electrically connect a sensor board 64 to the liquid lens 28. The board 42 may supply a plurality of driving voltages, which are distinguishable from each other, and the driving voltages may be transmitted through a plurality of terminals 48, respectively.

Meanwhile, the holder 18 included in the camera module may include a plurality of openings 52. After the liquid lens module 14 is inserted into the holder 18, the location and arrangement of the liquid lens module 14 may be adjusted using the liquid lens 28 that is exposed through the plurality of openings 52. Through this, the liquid lens module 14 may be mechanically aligned with the first lens unit 12 and the second lens unit 16.

The board 42 for supplying a driving voltage to the liquid lens 28 may be disposed at one side of the liquid lens 28. The plurality of terminals 48 included in the board 42 may be changed depending on the structure of the liquid lens 28.

FIG. 2 illustrates a first example of the liquid lens.

The liquid lens 28 illustrated in FIG. 2 may include two different liquids 26 and 24, e.g. a conductive liquid 26 and a non-conductive liquid 24, and at least one of the curvature or the shape of an interface 30 formed between the two liquids 26 and 24 may be adjusted using a driving voltage supplied to the liquid lens 28. The driving voltage supplied to the liquid lens 28 may be transmitted through a first electrode 74 and a second electrode 76. The second electrode 76 may include a plurality of voltage sectors in order to transmit multiple (e.g. four, eight, or the like) individual driving voltages, which are distinguishable from each other, and the first electrode 74 may transmit one common voltage.

In addition, the liquid lens 28 may include a third plate 12 and a second plate 16, which include a transparent material, and may further include a first plate 14, which is disposed between the third plate 12 and the second plate 16 and includes an open region having a predetermined inclined surface.

In addition, the liquid lens 28 may include a cavity 50, which is defined by the third plate 12, the second plate 16, and the open region in the first plate 14. Here, the cavity 50 may be filled with two liquids 26 and 24 having different properties (e.g. a conductive liquid and a non-conductive liquid), and an interface 30 may be formed between the two liquids 26 and 24 having different properties.

The lens region of the second plate 16, which encompasses the center portion thereof, may be thinner than the peripheral region thereof, which is connected to the first plate 14. One side of the second plate 16, which is oriented toward the cavity 50, may be formed such that the lens region is concavely recessed with respect to the peripheral region, but the opposite side of the second plate may be formed such that the lens region and the peripheral region are flat. However, the structure of the second plate 16 may be changed depending on the embodiment of the liquid lens 28. The lens region on the side that is opposite the cavity 50 may be concavely recessed. The second plate 16 may be formed such that the thickness of the lens region thereof, which is an optical path, is smaller than the thickness of the peripheral region thereof that is bonded to the first plate 14.

Further, at least one of the two liquids 26 and 24 included in the liquid lens 28 may be conductive, and the liquid lens 28 may further include two electrodes 74 and 76, which are disposed on and under the first plate 14, and an insulation layer 72, which is disposed on the inclined surface that is liable to contact the conductive liquid. Here, the insulation layer 72 may cover one (e.g. the second electrode 76) of the two electrodes 74 and 76, and may expose a portion of the other one (e.g. the first electrode 74) of the two electrodes 74 and 76 so that electrical energy is applied to the conductive liquid (e.g. 26).

A board 48 may be connected to the two electrodes 74 and 76 included in the liquid lens 28 in order to transmit a driving voltage thereto. The curvature and the inclination of the interface 30 formed in the liquid lens 28 may be changed in response to the driving voltage transmitted through the board 48, whereby the focal length of the liquid lens 28 may be adjusted.

Meanwhile, the first plate 14 may include at least one first through-hole 56 and 54 formed therein. Referring to FIG. 2, a plurality of first through-holes 56 and 54 formed in the first plate 14 may extend to the third plate 12 and may be connected to the board 48. The first through-holes 56 and 54 may be formed so as to penetrate the first plate 14 in the upward-and-downward direction of the first plate 14. For example, the third plate 12 may also include through-holes, which are substantially the same as the first through-holes 54 and 56 in the first plate 14 and are formed at positions corresponding to the positions of the first through-holes 54 and 56. Among the plurality of first through-holes 56 and 54, the first through-hole 56, which is close to the cavity 50, may be connected to the second electrode 76, and the first through-hole 54, which is distant from the cavity 50, may be connected to the first electrode 74. That is, the plurality of first through-holes 56 and 54 may be electrically connected to the two different electrodes 76 and 74, respectively, and may transmit the supply voltages transmitted through the board 48 to the two different electrodes 76 and 74, respectively. In this case, conductive patterns or conductive regions on the board 48, which are connected to the first through-holes 56 and 54, respectively, may be electrically separated from each other. In addition, the first through-hole 54, which is connected to the first electrode 74, is electrically separated from the second electrode 76, and the first through-hole 56, which is connected to the second electrode 76, is electrically separated from the first electrode 74.

The driving voltage may be supplied to the first electrode 74 disposed on the first plate 14 through the at least one first through-hole 54 and 56. Thus, the board 48 for supplying the driving voltage to the liquid lens 28 may be disposed only below the third plate 12 without the necessity to place another board 48 around the second plate 16.

In some embodiments, the at least one first through-hole 54 and 56 may be used not only to transmit the driving voltage, but also to bond the first plate 14 and the third plate 12 to each other. It is common to connect the first plate 14 and the third plate 12 to each other through a bonding method using a metal layer (e.g. the second electrode 76) disposed between the first plate 14 and the third plate 12. However, in the case in which the first through-hole 54 and 56, which extends from the first plate 14 to the third plate 12, is provided plural in number, the first plate 14 and the third plate 12 may be bonded to each other through a method of charging an adhesive into at least one of the plurality of through-holes 54 and 56.

Sections (a) and (b) of FIG. 3 illustrate electrode sectors of the liquid lens. Specifically, section (a) of FIG. 3 illustrates an example in which four electrode sectors are included in the liquid lens 28, and section (b) of FIG. 3 illustrates an example in which eight electrode sectors are included in the liquid lens 28.

Referring to section (a) of FIG. 3, in one example, the liquid lens 28, the interface 30 of which is adjusted corresponding to a driving voltage, may receive a driving voltage through a plurality of electrode sectors L1, L2, L3 and L4 of the second electrode (the individual electrode), which are disposed at the same angular intervals from each other in four different directions. When the driving voltage is applied to the liquid lens through the electrode sectors L1, L2, L3 and L4 of the second electrode (the individual electrode), the interface 30 between the conductive liquid and the non-conductive liquid disposed in the lens region may be deformed. The degree and type of deformation of the interface 30 between the conductive liquid and the non-conductive liquid may be controlled by the driving voltage supplied to realize an AF function or an OIS function.

The interface 30 formed between the two liquids in the liquid lens 28 may be controlled by a driving voltage applied between the four electrode sectors L1, L2, L3 and L4 of the second electrode (the individual electrode, refer to in FIG. 2) and the first electrode CO (the common electrode, refer to 74 in FIG. 2). For example, the sum of the intensities of driving voltages may be determined by the autofocus (AF) function of the camera module, and variation in the individual driving voltages, into which the driving voltage is divided, may be determined by the optical image stabilization (OIS) function.

The focal length of the interface 30 when the individual driving voltage of 50 V is applied between each of the four electrode sectors L1, L2, L3 and L4 of the second electrode and the first electrode CO (the common electrode) may be shorter than the focal length of the interface 30 when the individual driving voltage of 40 V is applied between each of the four electrode sectors L1, L2, L3 and L4 of the second electrode and the first electrode CO (the common electrode). As the sum of the intensities of individual driving voltages applied to the four electrode sectors L1, L2, L3 and L4 of the second electrode increases, the focal length of the interface 30 may be shortened.

Meanwhile, the intensities of individual driving voltages applied between the four electrode sectors L1, L2, L3 and L4 of the second electrode and the first electrode CO (the common electrode) may not be the same as each other. As such, in the case in which individual driving voltages of different intensities are applied, the curvature of the interface 30 may become asymmetrical, and the interface 30 may be biased in a certain direction. For example, when the individual driving voltages applied between two electrode sectors L1 and L2 of the second electrode and the first electrode CO (the common electrode) are higher than the individual driving voltages applied between the two remaining electrode sectors L3 and L4 of the second electrode and the first electrode CO (the common electrode), the curvature of the interface 30 that is close to the two electrode sectors L1 and L2 of the second electrode may become greater than the curvature of the interface that is close to the two remaining electrode sectors L3 and L4 of the second electrode. Thereby, the interface 30 may be biased toward a region between the two electrode sectors L1 and L2 of the second electrode (e.g. in the leftward direction).

Referring to section (b) of FIG. 3, in one example, it is possible to move the interface 30 of the liquid lens 28, which includes eight electrode sectors L1, L2, L3, L4, X1, X2, X3 and X4 of the second electrode, i.e. two subgroups, in a predetermined direction by changing the driving voltage supplied thereto. Here, the first group, which is one of the two subgroups, includes four electrode sectors L1, L2, L3 and L4, and the second group, which is the other one of the two subgroups, includes four electrode sectors X1, X2, X3 and X4.

The liquid lens 28 including eight electrode sectors may move the focal point thereof in more various directions than the liquid lens 28 including four electrode sectors, which is shown in section (a) of FIG. 3.

For example, when a driving voltage of 50 V is supplied to each of the four electrode sectors L1, L2, L3 and L4 included in the first group, the focal point may be located at the center of the lens due to the interface 30. Even when a driving voltage of 50 V is supplied to the second group as well as the first group, the interface 30 may be located at the center of the lens. Thereafter, in order to perform the optical image stabilization (OIS) operation (e.g. when the position of the lens needs to be adjusted due to tilting of the camera module, hand tremor, or the like), different levels of individual supply voltages may be applied to the first group, which includes the four electrode sectors L1, L2, L3 and L4 of the second electrode. The driving voltage applied to each of the first and second electrode sectors L1 and L2 may be reduced from 50 V to 40 V, and the driving voltage applied to each of the third and fourth electrode sectors L3 and L4 may be increased from 50 V to 60 V. In this case, the curvature of the interface 30 may change, and accordingly the position at which an image that has passed through the interface 30 is formed may be moved to the right. At this time, a voltage may be applied to each of the electrode sectors of the second group, or may not be applied thereto. In the case in which a voltage is applied to the second group, the intensity of the voltage applied to each of the electrode sectors of the second group may be determined based on the voltages applied to the electrode sectors of the first group that are located on both sides of the corresponding electrode sector of the second group (e.g. the average level of the voltages applied to L1 and L2).

When it is desired to move the interface 30 positioned at the center of the liquid lens in a diagonal direction, individual supply voltages may be applied to the four electrode sectors X1, X2, X3 and X4 included in the second group among the plurality of subgroups (i.e. the eight electrode sectors of the second electrode) included in the second electrode of the liquid lens. For example, in order to realize the interface 30, which moves the focal point in a diagonal direction, it is necessary to adjust voltages applied to the four electrode sectors L1, L2, L3 and L4. For example, the voltage applied to each of the first and third electrode sectors L1 and L3 may be maintained at 50 V, whereas the individual driving voltages applied to the second and fourth electrode sectors L2 and L4 may be respectively adjusted to 30 V and 70 V. Here, the individual driving voltages, the levels of which have been adjusted, may not be applied to the four electrode sectors L1, L2, L3 and L4, but may be changed by the connection part located between the liquid lens and the control circuit or between the liquid lens and the driving circuit. For example, an individual driving voltage of 40 V may be generated by adding the individual driving voltage of 50 V applied to the first electrode sector L1 and the individual driving voltage of 30 V applied to the second electrode sector L2 and dividing the sum thereof in half, and the individual driving voltage of 40 V may be applied to the fifth electrode sector X1 located between the first electrode sector L1 and the second electrode sector L2. In the same manner, individual driving voltages of 40 V, 60 V and 60 V may be respectively applied to the sixth, seventh, and eighth electrode sectors X2, X3 and X4. When individual driving voltages are applied to the second group including the four electrode sectors X1, X2, X3 and X4, individual driving voltages may not be applied to the first group including the four electrode sectors L1, L2, L3 and L4.

Meanwhile, in some embodiments, driving voltages may be supplied to the eight electrode sectors in order to move the focal point in a diagonal direction. The intensities of the driving voltages supplied to the plurality of electrode sectors may vary depending on a method of controlling the interface 30 of the liquid lens 28 and the operation range and performance of the driving voltage generator or the controller that supplies driving voltages to the liquid lens 28.

As described above, the liquid lens 28 includes a plurality of electrode sectors. As the number of electrode sectors increases, the movement of the focal point through the interface 30 in the liquid lens 28 may be more precisely controlled. As the number of electrode sectors in the liquid lens 28 increases, it is required to form a more precise pattern. In addition, as the number of electrode sectors increases, the structures, shapes, and patterns of the first electrode 74 (refer to FIG. 2) and the second electrode 76 (refer to FIG. 2) may become complicated, and the structure for individually supplying driving voltages to the first electrode 74 and the second electrode 76 may become complicated, which makes it difficult to ensure a process margin of the liquid lens 28. In order to overcome this problem, as described with reference to FIG. 2, at least one first through-hole 54 and 56 may be formed in the first plate 14 of the liquid lens 28.

Sections (a) to (c) of FIG. 4 illustrate other examples of the liquid lens. Specifically, section (a) of FIG. 4 illustrates an example of a liquid lens including four electrode sectors, section (b) of FIG. 4 illustrates an example of a liquid lens including eight electrode sectors, and section (c) of FIG. 4 illustrates an example of a liquid lens including at least ten electrode sectors.

Referring to section (a) of FIG. 4, two through-holes are included in each electrode sector of the first plate 14C and the third plate 12C in the liquid lens 28C. Each through-hole may expose a bar-shaped space in the plane and may be connected to the board 48C. The through-hole that is close to the center of the liquid lens 28C may be connected to the board 48C and to the second electrode 76 (refer to FIG. 2), which may be disposed and extend between the first plate 14C and the third plate 12C. On the other hand, the through-hole that is distant from the center of the liquid lens 28C may be connected to the board 48C and to the first electrode 74 (refer to FIG. 2) disposed on the first plate 14C. The regions to which the through-holes are connected are marked in black.

In addition, in the liquid lens 28C, the first plate 14C and the third plate 12C may be bonded to each other using a metal layer, which is disposed for hermetic sealing, and laser heat. Alternatively, in some embodiments, the first plate 14C and the third plate 12C may be bonded to each other using the illustrated adhesive pattern 58C. The adhesive pattern 58C may be formed by applying an adhesive material, and may be disposed around the center portion of the liquid lens 28C, i.e. around the cavity 50 (refer to FIG. 2), and between the electrode sectors. In the case of using an adhesive agent or an adhesive material, it may be difficult to properly realize hermetic sealing. However, since the first plate 14C and the third plate 12C of the liquid lens 28C include the through-holes formed therein, through which driving voltages are applied to the first electrode 74 and the second electrode 76, it is possible to overcome the problem with a conventional method in which an excessive amount of metal is disposed on the first plate 14C in consideration of loss of metal in thermal bonding using laser. In addition, the plurality of through-holes included in the first plate 14C and the third plate 12C may be used as an element for bonding the first plate 14C and the third plate 12C to each other as well as an element for transmitting the driving voltage. Although the adhesive pattern 58C is described as being used to bond the first plate 14C and the third plate 12C to each other, the adhesive pattern 58C may be disposed outside the liquid lens 28C so as to be used to bond the first plate 14C and the second plate 16C to each other.

Referring to section (b) of FIG. 4, a plurality of through-holes is included in each electrode sector of the first plate 14D and the third plate 12D in the liquid lens 28D. Each through-hole may expose a circular or polygonal space in the plane and may be connected to the board 48D. The through-hole that is close to the center of the liquid lens 28D may be connected to the board 48D and to the second electrode 76 (refer to FIG. 2), which may be disposed and extend between the first plate 14D and the third plate 12D. On the other hand, the through-hole that is distant from the center of the liquid lens 28D may be connected to the board 48D and to the first electrode 74 (refer to FIG. 2) disposed on the first plate 14D. The regions to which the through-holes are connected are marked in black. The same number of through-holes may be disposed in each electrode sector. As the number of through-holes is larger, the electrical connection of the board 48D to the first electrode 74 and the second electrode 76 may be further facilitated.

In addition, half of the through-holes included in each electrode sector may be connected to the first electrode 74 and the other half may be connected to the second electrode 76. The number of through-holes connected to the first electrode 74 or the second electrode 76 may vary depending on the embodiments.

Meanwhile, in the liquid lens 28D, the first plate 14D and the third plate 12D may be bonded to each other using a metal layer, which is disposed for hermetic sealing, and laser heat. Alternatively, in some embodiments, the first plate 14D and the third plate 12D may be bonded to each other using the illustrated adhesive pattern 58D.

Referring to section (c) of FIG. 4, one through-hole is included in each electrode sector of the first plate 14E in the liquid lens 28E, and a plurality of through-holes is included in each electrode sector of the third plate 12E in the liquid lens 28E. Each through-hole included in the first plate 14E and the third plate 12E may expose a circular or polygonal space in the plane and may be connected to the board 48D. The through-hole that is included in the third plate 12E and is close to the center of the liquid lens 28E may be connected to the board 48E and to the second electrode 76 (refer to FIG. 2), which may be disposed and extend between the first plate 14E and the third plate 12E. On the other hand, the through-hole that is included in the third plate 12E and is distant from the center of the liquid lens 28E may be connected to the board 48E and to the first electrode 74

(refer to FIG. 2) disposed on the first plate 14E. The regions to which the through-holes are connected are marked in black.

The third plate 12E may include a plurality of through-holes in each electrode sector, and the first plate 14E may include one through-hole in each electrode sector. This is because the second electrode 76 is formed so as to extend from the region below the first plate 14E to the region on the first plate 14E via the inclined surface and thus it may be unnecessary to penetrate the first plate 14E in order to connect the second electrode 76.

In addition, in the liquid lens 28E, the first plate 14E and the third plate 12E may be bonded to each other using a metal layer, which is disposed for hermetic sealing, and laser heat. Alternatively, in some embodiments, the first plate 14E and the third plate 12E may be bonded to each other using the illustrated adhesive pattern 58E.

In the liquid lens 28C, 28D and 28E described above with reference to sections (a) to (c) of FIG. 4, the first plate 14C, 14D and 14E includes at least one through-hole in each of the plurality of electrode sectors, and the third plate 12C, 12D and 12E includes a plurality of through-holes in each of the plurality of electrode sectors. These through-holes may be patterned before, after, or simultaneously with the process of patterning the center of the first plate 14C, 14D and 14E in order to form the cavity 50 (refer to FIG. 2).

Sections (a) to (c) of FIG. 5 illustrate the structure of a conductive pattern in the through-hole included in the first plate or the third plate.

Referring to section (a) of FIG. 5, a conductive material may be applied to an inner side surface of the through-hole 54 and 56 (refer to FIG. 2) included in the first plate 14 or the third plate 12 to form a conductive pattern 54A on the inner side surface of the through-hole 54 and 56, and the center portion of the through-hole 54 and 56 may be empty. Since one conductive pattern 54A is included in the through-hole 54 and 56, the through-hole 54 and 56 needs to be connected to only one of the first electrode 74 and the second electrode 76.

Referring to section (b) of FIG. 5, a conductive material may be applied to an inner side surface of the through-hole 54 and 56 (refer to FIG. 2) included in the first plate 14 or the third plate 12 to form a conductive pattern 54B on the inner side surface of the through-hole 54 and 56, and the center portion of the through-hole 54 and 56 may be filled with an adhesive material. In this case, the adhesive material may be insulating. Similarly to the structure described with reference to section (a) of FIG. 5, since one conductive pattern 54B is included in the through-hole 54 and 56, the through-hole 54 and 56 needs to be connected to only one of the first electrode 74 and the second electrode 76. Meanwhile, the adhesive material charged in the center portion of the through-hole 54 and 56 may enable the through-hole 54 and 56 to serve to transmit driving voltages, to bond two different plates, to increase bonding strength, or to assist hermetic sealing.

Referring to section (c) of FIG. 5, a conductive material may be applied to an inner side surface of the through-hole 54 and 56 (refer to FIG. 2) included in the first plate 14 or the third plate 12 to form a first conductive pattern 54C on the inner side surface of the through-hole 54 and 56, a second conductive pattern 54D, which is distinguished from the first conductive pattern 54C, is formed in the center portion of the through-hole 54 and 56, and the space between the first conductive pattern 54C and the second conductive pattern 54D may be filled with an adhesive material. In this case, the adhesive material may be insulating. The first conductive pattern 54C and the second conductive pattern 54D may be electrically connected to each other or may not be electrically connected to each other depending on the embodiments. If the first conductive pattern 54C and the second conductive pattern 54D are not electrically connected to each other, the through-holes 54 and 56 may transmit mutually different driving voltages to the first electrode 74 and the second electrode 76. If the first conductive pattern 54C and the second conductive pattern 54D are electrically connected to each other, the through-holes 54 and 56 need to be connected to only one of the first electrode 74 and the second electrode 76. Meanwhile, the adhesive material charged between the first conductive pattern 54C and the second conductive pattern 54D of the through-hole 54 and 56 may bond two different plates, may increase bonding strength, or may assist hermetic sealing.

FIG. 6 illustrates the structure of a board for applying driving voltages to the liquid lens.

Referring to FIG. 6, the board 48 for supplying driving voltages to the liquid lens 28 (refer to FIG. 2) may be disposed on one side of the liquid lens 28, and may be electrically connected to the first electrode 74 and the second electrode 76 of the liquid lens 28. The board 48 may transmit a common voltage CO to the first electrode 74 and may transmit individual voltages to the second electrode 76 including a plurality of electrode sectors L1, L2, L3 and L4. Here, the board 48 is described as having a structure corresponding to the case in which the second electrode 76 of the liquid lens 28 includes four electrode sectors L1, L2, L3 and L4. However, in the case in which the second electrode 76 of the liquid lens 28 includes a larger number of electrode sectors (eight, sixteen, or the like), the board 48 may include a conductive pattern corresponding thereto.

Alternatively, in some embodiments, the board 48 may include a control circuit for adding, dividing, or selectively transmitting the driving voltages, thereby selectively controlling the plurality of electrode sectors included in the second electrode 76 of the liquid lens 28 or adjusting the magnitudes of the driving voltages transmitted thereto.

FIG. 7 illustrates still another example of the liquid lens. Specifically, sections (a) to (c) of FIG. 7 illustrate examples of the liquid lens in which a trench or a through-hole is included in the first plate 14F, 14G and 14H. Here, the trench has a structure that is etched to a predetermined depth from the upper surface or the lower surface of the first plate, and the through-hole has a structure that penetrates the region between the upper surface and lower surface of the first plate. Since the trench does not penetrate the region between the upper surface and the lower surface of the first plate, the trench is not used as a structure for electrically connecting the electrodes disposed on and under the first plate. Meanwhile, an adhesive material is charged in the trench in order to assist hermetic sealing with the second plate and the third plate, which are disposed on and under the first plate, respectively.

First, referring to section (a) of FIG. 7, a plurality of trenches is included in the upper portion and the lower portion of the first plate 14F of the liquid lens 28F. The first plate 14F may not include a through-hole for connecting the electrodes disposed on and under the first plate 14F, but may include a plurality of trenches, thereby realizing hermetic sealing with the second plate and the third plate, which are disposed on and under the first plate 14F.

In addition, referring to section (b) of FIG. 7, both a trench and a through-hole may be included in the first plate 14G of the liquid lens 28G. The trench included in the first plate 14G may be used for hermetic sealing with the second plate and the third plate, which are disposed on and under the first plate 14G. In addition, the through-hole included in the first plate 14G may be used to connect the electrodes disposed on and under the first plate 14G. In this case, the trench may be disposed to be closer to the center region of the liquid lens 28G (the center of the cavity in which two liquids are charged) than the through-hole. In addition, the trench may be disposed outside the cavity in order to realize hermetic sealing of the liquid lens 28G. Hermetic sealing is necessary to the liquid lens 28G in order to prevent the two liquids in the cavity from leaking outside or to prevent external air from entering the cavity. When the trench is disposed in a region adjacent to the cavity, the effect of hermetic sealing may be increased.

Meanwhile, referring to section (c) of FIG. 7, a plurality of through-holes and a plurality of trenches may be included in the first plate 14H of the liquid lens 28H. The plurality of through-holes may be used to connect the electrodes disposed on and under the first plate 14H, and the trenches may be used for hermetic sealing with the second plate and the third plate, which are disposed on and under the first plate 14H. In this case, the trenches may be disposed to be closer to the center region of the liquid lens 28H (the center of the cavity in which two liquids are charged) than the through-holes.

The through-hole described with reference to sections (a) to (c) of FIG. 7 may include at least one or both of a conductive material and an adhesive material, as described with reference to sections (a) to (c) of FIG. 5. In addition, the through-hole may include two conductive layers (used to connect respectively different electrodes), which are electrically isolated using an insulating material charged in the through-hole. Meanwhile, the trench described with reference to sections (a) to (c) of FIG. 7 may not be filled with a conductive material, but may be filled with an adhesive material.

Meanwhile, referring to sections (a) to (c) of FIG. 7, the through-hole and the trench may have a ring-shaped or bar-shaped planar structure. In addition, a plurality of through-holes or a plurality of trenches, having a small circular or polygonal shape, may be disposed at predetermined intervals in the liquid lens. The number and shape of through-holes and trenches may vary depending on the embodiments of the liquid lens.

FIG. 8 illustrates a method of assembling the liquid lens.

First, referring to section (a) of FIG. 8, at least one trench and at least one through-hole as well as a cavity region may be disposed in the first plate 14J.

Subsequently, referring to section (b) of FIG. 8, an adhesive material 58A may be charged into the trench formed in one side of the first plate 14J, and thereafter the third plate 12J may be bonded to the first plate 14J.

Subsequently, referring to section (c) of FIG. 8, an adhesive material 58B may be charged into the through-hole or the trench included in the first plate 14J, to which the third plate 12J has been bonded, and thereafter the second plate 16J may be bonded to the first plate 14J.

As described with reference to sections (a) to (c) of FIG. 8, an adhesive material may be charged into at least one trench and at least one through-hole included in the first plate 14J, and thereafter the second plate 16J and the third plate 12J may be bonded to the first plate 14J, thereby further facilitating hermetic sealing.

In one embodiment, a liquid lens may include a first plate including a cavity in which a conductive liquid and a non-conductive liquid are disposed and a first through-hole in which at least one of a conductive material or an adhesive material is disposed, a first electrode disposed on the first plate, a second electrode disposed under the first plate, the second electrode including a plurality of electrode sectors, a second plate disposed on the first electrode, and a third plate disposed under the second electrode.

For example, the first through-hole may be formed so as to penetrate the first plate in an upward-and-downward direction of the first plate.

For example, the liquid lens may include a trench in which the adhesive material is disposed, the trench being disposed in the first plate.

For example, the conductive material may be disposed on the inner circumferential surface of the first through-hole.

For example, the adhesive material disposed in the first through-hole may be disposed on the inner circumferential surface of the conductive material.

For example, the first through-hole may be disposed at a position corresponding to the first electrode or the second electrode.

For example, the third plate may include a second through-hole corresponding to the first through-hole.

For example, at least one of the first through-hole or the second through-hole may include a first conductive pattern disposed on the inner circumferential surface of the first through-hole or the second through-hole, a second conductive pattern disposed inside the first conductive pattern, and an insulating adhesive material disposed between the first conductive pattern and the second conductive pattern.

For example, the trench may be disposed to be closer to the cavity than the through-hole.

In another embodiment, a camera module may include the liquid lens according to the above embodiment, an image sensor converting light transmitted through the liquid lens into an electrical signal, a control circuit generating an electrical signal or a driving voltage or transmitting the electrical signal or the driving voltage to the first electrode or the second electrode included in the liquid lens in order to control the interface, and a board electrically connected to the conductive material disposed in the through-hole, the board supplying a driving voltage to the first electrode or the second electrode.

Meanwhile, in some embodiments, in a device and module including a liquid lens, a connection device for connecting a control circuit or a driving circuit to individual electrodes of the liquid lens may include the above-described circuit or logic for changing individual driving voltages or determining electrodes to which the individual driving voltages are to be applied.

An optical device (or an optical instrument) including the above-described camera module may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

The method according to the embodiment described above may be programmed to be executed in a computer and may be stored on a computer-readable recording medium. Examples of the computer-readable recording medium include ROM, RAM, CD-ROMs, magnetic tapes, floppy disks, and optical data storage devices.

The computer-readable recording medium may also be distributed over network-coupled computer systems so that the computer-readable code is stored and executed in a distributed fashion. Also, functional programs, code, and code segments for accomplishing the above-described method may be easily construed by programmers skilled in the art to which the embodiment pertains.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

MODE FOR INVENTION

Various embodiments have been described in the best mode for carrying out the disclosure.

INDUSTRIAL APPLICABILITY

A liquid lens, a camera module including the same, and an optical device according to the embodiments may be used in portable devices such as, for example, camera/video devices, telescopic devices, microscopic devices, an interferometer, a photometer, a polarimeter, a spectrometer, a reflectometer, an auto-collimator, a lens-meter, a smartphone, a laptop computer, and a tablet computer.

The invention claimed is:

1. A liquid lens, comprising:
   a first plate comprising a cavity in which a conductive liquid and a non-conductive liquid are disposed and at least one first through-hole in which at least one of a conductive material or an adhesive material is disposed;
   a first electrode disposed on the first plate;
   a second electrode disposed under the first plate, the second electrode comprising a plurality of electrode sectors;
   a second plate disposed on the first electrode; and
   a third plate disposed under the second electrode.

2. The liquid lens according to claim 1, wherein the at least one first through-hole is formed so as to penetrate the first plate in an upward-and-downward direction of the first plate.

3. The liquid lens according to claim 1, comprising a trench in which the adhesive material is disposed, the trench being disposed at the first plate.

4. The liquid lens according to claim 3, wherein the trench is disposed to be closer to the cavity than the at least one first through-hole.

5. The liquid lens according to claim 4, wherein the trench is disposed outside the cavity.

6. The liquid lens according to claim 1, wherein the conductive material is disposed on an inner circumferential surface of the at least one first through-hole.

7. The liquid lens according to claim 6, wherein the adhesive material disposed in the at least one first through-hole is disposed on an inner circumferential surface of the conductive material.

8. The liquid lens according to claim 7, wherein the at least one first through-hole is disposed at a position corresponding to the first electrode or the second electrode.

9. The liquid lens according to claim 6, wherein a center portion of the at least one first through-hole is empty.

10. The liquid lens according to claim 1, wherein the third plate comprises at least one second through-hole corresponding to the at least one first through-hole.

11. The liquid lens according to claim 10, wherein at least one of the at least one first through-hole or the at least one second through-hole comprises:
    a first conductive pattern disposed on an inner circumferential surface of the at least one first through-hole or the at least one second through-hole;
    a second conductive pattern disposed inside the first conductive pattern; and
    an insulating adhesive material disposed between the first conductive pattern and the second conductive pattern.

12. The liquid lens according to claim 11, wherein the first conductive pattern and the second conductive pattern are electrically connected to each other.

13. The liquid lens according to claim 11, wherein the first conductive pattern and the second conductive pattern are not electrically connected to each other.

14. The liquid lens according to claim 10, wherein the first plate and the third plate are bonded to each other by the adhesive material buried into the at least one first through-hole and the at least one second through-hole.

15. The liquid lens according to claim 10, wherein the at least one first through-hole includes a plurality of first through-holes, and wherein the at least one second through-hole includes a plurality of second through-holes corresponding to the plurality of first through-holes, respectively.

16. The liquid lens according to claim 15, wherein a portion of the first and second through-holes is connected to the first electrode, and
    wherein a remaining portion of the first and second through-holes is connected to the second electrode.

17. The liquid lens according to claim 16, wherein a first number of the portion connected to the first electrode among the first and second through-holes is different from a second number of the remaining portion connected to the second electrode among the first and second through-holes.

18. A camera module, comprising:
    a liquid lens described in claim 1;
    an image sensor converting light transmitted through the liquid lens into an electrical signal;
    a control circuit generating an electrical signal or a driving voltage, or transmitting the electrical signal or the driving voltage to the first electrode and the second electrode included in the liquid lens in order to control an interface formed between the conductive liquid and the non-conductive liquid; and
    a board configured to be electrically connected to the conductive material disposed in the at least one first through-hole, the board supplying a driving voltage to the first electrode or the second electrode.

19. The liquid lens according to claim 1, wherein the adhesive material has a pattern.

20. The liquid lens according to claim 19, wherein the first plate and the third plate are bonded to each other by the adhesive material.

* * * * *